(12) United States Patent
Bailey et al.

(10) Patent No.: US 7,180,872 B2
(45) Date of Patent: Feb. 20, 2007

(54) DSLAM-HOSTED INFORMATION STORAGE FUNCTIONALITY

(75) Inventors: Josh Bailey, Raleigh, NC (US); Kenneth DePaul, Wake Forest, NC (US)

(73) Assignee: Alcatel, Paris (FR)

( * ) Notice: Subject to any disclaimer, the term of this patent is extended or adjusted under 35 U.S.C. 154(b) by 1081 days.

(21) Appl. No.: 10/227,934

(22) Filed: Aug. 26, 2002

(65) Prior Publication Data

US 2005/0190780 A1    Sep. 1, 2005

(51) Int. Cl.
  *G01R 31/08*    (2006.01)
(52) U.S. Cl. ...................... 370/252; 370/397
(58) Field of Classification Search ......... 370/252, 370/397, 356
  See application file for complete search history.

(56) References Cited

U.S. PATENT DOCUMENTS

| | | | |
|---|---|---|---|
| 6,385,693 B1 * | 5/2002 | Gerszberg et al. | 711/118 |
| 6,731,607 B1 * | 5/2004 | Mantin | 370/254 |
| 6,885,672 B1 * | 4/2005 | Tang et al. | 370/412 |
| 7,088,722 B1 * | 8/2006 | Hann | 370/395.2 |

* cited by examiner

*Primary Examiner*—Doris H. To
*Assistant Examiner*—Steven Blount
(74) *Attorney, Agent, or Firm*—Bobby D. Slaton; V. Lawrence Sewell

(57) ABSTRACT

One embodiment of the disclosures made herein is a Digital Subscriber Line Access Multiplexer (DSLAM) adapted for facilitating DSLAM-hosted information storage functionality. In accordance with such embodiment, the DSLAM includes a storage apparatus and a storage management apparatus. The storage management apparatus is adapted for enabling data storage functionality to be facilitated between a subscriber data processing system and the storage apparatus. Such data storage functionality includes preparing a subscriber storage space account designating at least a portion of available storage space of the storage apparatus as a mapped network drive on the subscriber data processing system; receiving a storage space access request from a data processing system accessible by a subscriber; creating a cross-connection between the storage apparatus and a Digital Subscriber Line (DSL) circuit serving the subscriber in response to verifying the storage space access request; and creating at least one of a virtual connection (VC) and a tunnel between a Digital Subscriber Line (DSL) circuit serving a subscriber and a subscriber data processing system.

38 Claims, 6 Drawing Sheets

DSLAM-HOSTED INFORMATION STORAGE FUNCTIONALITY

FIELD OF THE DISCLOSURE

The disclosures made herein relate generally to Digital Subscriber Line Access Multiplexers (DSLAM) and more particularly to facilitating DSLAM-hosted information storage functionality.

BACKGROUND

Digital service subscribers are beginning to be offered various types of rich content over their Digital Subscriber Line (DSL) connections. Streamed videos, multicast videos, real-time communication, videoconferencing and network-based gaming applications are examples of such rich content. Digital Subscriber Line Access Multiplexer (DSLAM) hosted application cards represent one example of means for offering such rich content via DSL connections.

As subscribers are offered such rich content over their DSL connection, hard-drive storage space resident on a subscriber's data processing computer, set-top box, etc) will often be a limiting factor in performance of the subscriber's data processing system. For example, as a hard drive resident on a subscriber's data processing system fills up, performance of the subscriber's data processing system can be adversely impacted.

In an effort to offer subscribers with a solution to limited resident hard drive space, Application Service Providers (ASP's) offer high-capacity information storage services (e.g., on a hard drive) over the Internet via ASP-managed network equipment (i.e. Internet Access Storage). Telecommunication (Telco) service providers presently do not offer high-capacity information storage services via Telco access network equipment. Internet Access Storage (IAS) is often unreliable and inefficient due to network congestion. Furthermore, for any number of reasons, IAS is generally not suitable for storing and running applications. Public access network hosted storage via disk drive units are primarily used to store files, not applications.

The introduction of DSLAM-hosted application cards will require that many DSLAM's have high-capacity storage space (e.g., hard drive disk space) for storing content and database files. The alternative would be for each application card to be designed with storage drives (i.e., card-hosted storage). Card-hosted storage adds expense, physical size, and power consumption to each card. Furthermore, card hosted storage often provides less than adequate available storage space. In some cases, such expense, physical size, available storage space, and power consumption may make limit the practicality of associated application cards being hosted within a DSLAM. Other than on-board memory and Flash disks, there is presently no type of high-capacity storage apparatus available for content storage on a DSLAM.

Therefore, methods and equipment adapted for hosting storage services at a DSLAM in a manner that overcomes the limitations associated with conventional methods and equipment for providing network-based storage services is useful.

BRIEF DESCRIPTION OF THE DRAWING FIGURES

DETAILED DESCRIPTION OF THE DRAWING FIGURES

Figure 1:
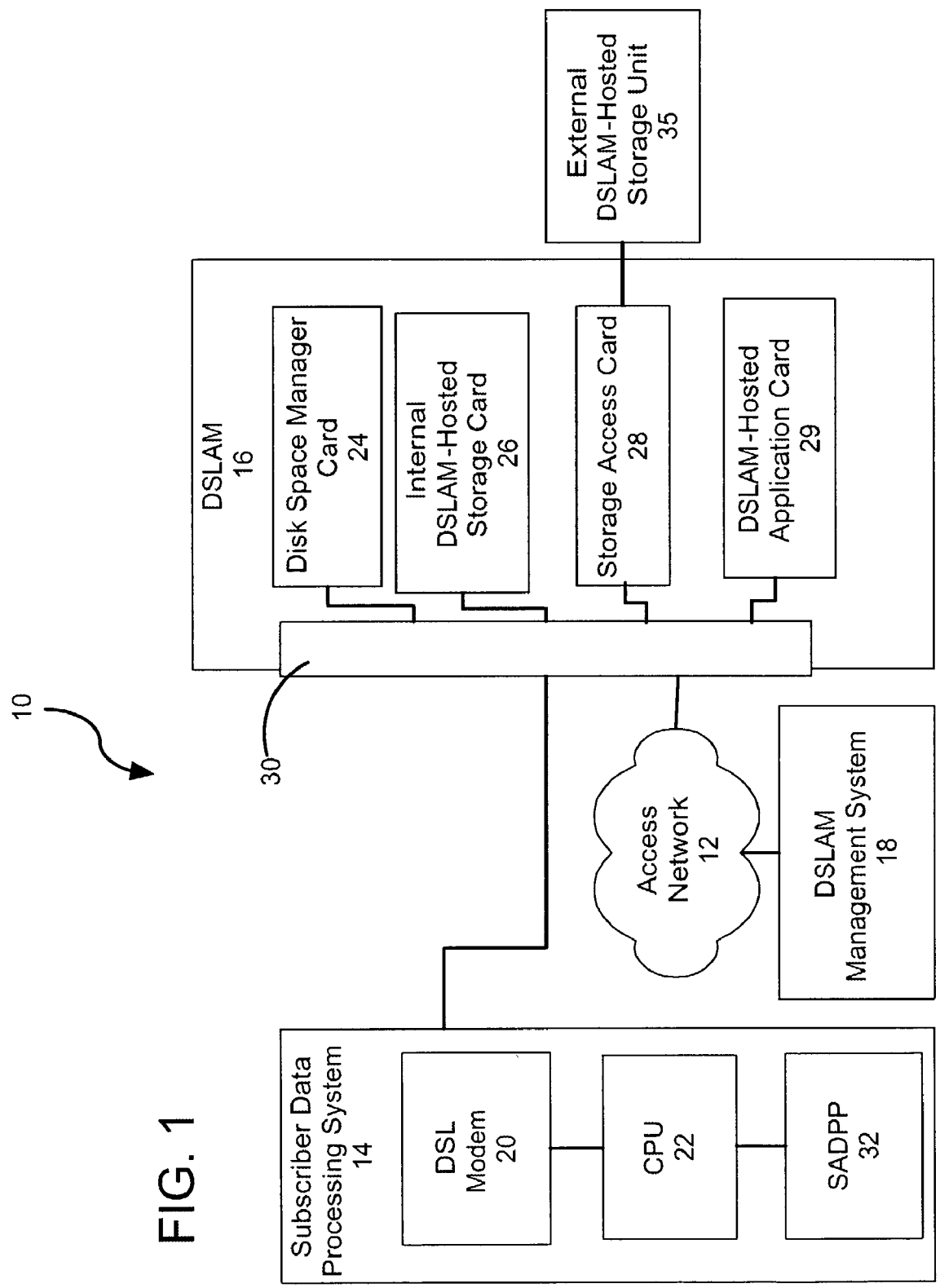
FIG. 1 is a block diagrams depicting an embodiment of a communication system adapted for facilitating DSLAM-hosted information storage functionality in accordance with the disclosures made herein.

The disclosures made herein relate to facilitating Digital Subscriber Line Access Multiplexer (DSLAM) hosted information storage functionality. Embodiments of facilitating DSLAM-hosted storage functionality in accordance with the disclosures made herein enable a subscriber to store information on and retrieve information from a storage apparatus (i.e. a high-capacity hard drive card) that is connected to a DSLAM and that serves the subscriber (i.e., hosted by the DSLAM). Generally speaking, this means that the storage apparatus is located at a peripheral location of an access network with the DSALM, being the closest of any Telecommunication (Telco) access network equipment to the subscriber and far closer than most Application Service Provider (ASP) equipment. Accordingly, such an arrangement affords the subscriber with fast access to the storage apparatus relative to Internet Access Storage solutions.

A DSLAM-hosted storage apparatus offers a number of advantages over Internet Access Storage solutions. One advantage is that the close proximity of a DSLAM to the subscriber provides efficient and reliable access to a DSLAM-hosted storage apparatus as storage and retrieval of information is not subjected to congestion of public networks such as the Internet. Another advantage is that storage of subscriber files on a DSLAM-hosted storage apparatus will limit degradation of the subscriber's data processing system performance that may otherwise arise from the resident storage apparatus of the subscriber's data processing system (e.g., a hard drive) becoming too full. Yet another advantage is that a DSLAM-hosted storage apparatus effectively serves a DSLAM-hosted application card that requires high-capacity storage for storing and retrieving information such as content and database files. Implementation of the DSLAM-hosted storage apparatus allows storage requirements to be met via the DSLAM-hosted storage apparatus rather than resident storage on the DSLAM-hosted application card. By accommodating such storage requirements via the DSLAM-hosted storage apparatus rather than solely via a storage apparatus resident on the DSLAM-hosted application card, attributes of the DSLAM-hosted application card that are adversely affected by implementing on-board storage (e.g., expense, physical size, maximum storage capacity, heat dissipation and power consumption) are far less likely to adversely impact the practicality of the application card being hosted within the DSLAM.

One embodiment of the disclosures made herein is a DSLAM adapted for facilitating DSLAM-hosted information storage functionality. In accordance with such an embodiment, the DSLAM includes a storage apparatus and a storage management apparatus. The storage management apparatus is adapted for enabling data storage functionality to be facilitated between a subscriber data processing system and the storage apparatus. Such data storage functionality includes preparing a subscriber storage space account designating at least a portion of available storage space of the storage apparatus as a mapped network drive on the subscriber data processing system; receiving a storage space access request from a data processing system accessible by a subscriber; creating a cross-connection between the storage apparatus and a Digital Subscriber Line (DSL) circuit serving the subscriber in response to verifying the storage space access request; and creating at least one of a virtual connection (VC) and a tunnel between a Digital Subscriber Line (DSL) circuit serving a subscriber and a subscriber data processing system.

Referring to FIG. 1, an embodiment of a communication system 10 in accordance with the disclosures made herein is depicted. The communication system 10 includes an access network 12 and a subscriber data processing system 14 connected to the access network 12. The access network 12 includes a DSLAM 16 and a DSLAM management system 18. The DSLAM 16 and the DSLAM management system 18 are depicted separately from the access network 12 for clarity. Effectively, the DSLAM 16 and the DSLAM management system 18 are connected within the access network 12. The subscriber data processing system 14 includes a Digital Subscriber Line (DSL) modem 20 and a central processing unit (CPU) 22. The DSL modem 20 is connected between the DSLAM 16 and the CPU 22 for facilitating communication between the access network 12 and the CPU 22.

The DSLAM 16 is an example of a network element adapted for providing digital subscriber line access multiplexing functionality. A computer running a data processing program adapted for monitoring and/or affecting the operation of the DSLAM 16 is an example of the DSLAM management system 18. A personal computer and a set-top box are examples of the CPU 22. It is contemplated herein that the modem 20 and CPU 22 may be integrally packaged.

The DSLAM 16 includes a Disk Space Manager (DSM) card 24, an internal DSLAM-hosted storage card 26, a Storage Access card (SA) card 28 and a DSLAM-hosted application card 29. The DSM card 24, the internal DSLAM-hosted storage card 26, the SA card 28 and DSLAM-hosted application card 29 are interconnectable to each other through a backplane 30 of the DSLAM 16. In this manner, cross-connections are capable of being made between each of the DSM card 24, the internal DSLAM-hosted storage card 26, the SA card 28 and the DSLAM-hosted application card 29. It is contemplated and disclosed herein that the DSM card 24, the internal DSLAM-hosted storage card 26, the SA card 28 and the DSLAM-hosted application card 29 may each be cards that plug into one or more slots (e.g., depending on size, power consumption, etc) of a chassis (not shown) of the DSLAM 16.

The internal DSLAM-hosted storage card 26 provides information storage space within the DSLAM 16. Because the internal DSLAM-hosted storage card 26 is located within the access network 12 (i.e. within the DSLAM 16), information may be accessed using the subscriber data processing system 14 while bypassing public networks such as the Internet. Accordingly, the DSLAM-hosted storage card 26 provides subscribers who are served from the DSLAM 16 with fast, safe and reliable access to disk space remote from the CPU 22 of the subscriber data processing system 14.

The internal DSLAM-hosted storage card 26 is an example of a storage apparatus and of a means for enabling information storage functionality. Similarly, the DSLAM-hosted application card 29 is an example of a DSLAM-hosted application and of a means for enabling DSLAM-hosted application functionality.

Because the internal DSLAM-hosted storage device 26 is non-specific in its application, several DSLAM-hosted application cards are able to share the available storage space of the internal DSLAM-hosted storage device 26. Application cards hosted by the DSLAM 16 (e.g., the DSLAM-hosted application card 29 or application cards subtended from the DSLAM (not shown) will communicate with the Internal DSLAM-hosted storage card 26 through the backplane 30. With the ability of other cards in the DSLAM 16 to communicate and set-up data paths, to the internal DSLAM-hosted storage card 26, the internal DSLAM-hosted storage device 26 can be used for content storage, hosting a database to keep track of users, or merely serve as a "hard-drive" for DSLAM-hosted application cards (e.g., the DSLAM-hosted application card 29).

The DSM card 24 performs functions such as communicating with a storage access application (SAA) 32 of the subscriber data processing system 14 and preparing/managing a storage space account for the subscriber. Through communication between the DSM card 24 and the SAA 32, a connection (e.g., a new virtual connection (VC), or a tunnel) is created over a DSL 34 between the subscriber data processing system 14 and the DSM card 24 (e.g. via a cross connection through the backplane 30). The storage space account designates an amount of allocated storage space on the internal DSLAM-hosted storage card 26 for the subscriber. Once the connection is created over the DSL 34, the allocated storage space appears at the subscriber data processing system 14 as a mapped network drive.

The DSM card 24 is an example of a storage management apparatus and of a means for enabling storage management functionality. The SAA 32 is an example of a storage access data processor program and of a client means for enabling storage access functionality.

If the connection created on the DSL 34 is a new VC, traffic between the subscriber data processing system 14 and the Internal DSLAM-hosted storage card 26 can be assigned a level of Quality of Service (QoS), such as a Constant Bit Rate (CBR). In this manner, traffic to and from the internal DSLAM-hosted storage card 26 takes precedence over Internet traffic on the DSL 34. Furthermore, it is contemplated herein that an upgrade to a subscriber's DSL bandwidth may be implemented to support or enhance functionality associated with the internal DSLAM-hosted storage card 26.

A connection may be created between the DSLAM management system 18 and the DSM card 24 for enabling a service provider to access the DSM card 24. In this manner, the service provider may perform functions such as monitoring and/or configuring of operations performed/managed by the DSM card 24.

An external DSLAM-hosted storage unit 35 is connected to the DSLAM 16 via a high-speed interface 36 terminating on the SA card 28. The SA card 28 manages access to and from the external storage device 35. Examples of the high-speed interface 36 include a gigabit Ethernet link, a high-speed serial link and a parallel data cable. The external DSLAM-hosted storage unit 35 is an example of a storage apparatus and of a means for enabling information storage functionality.

The external DSLAM-hosted storage unit 35 is co-located with the DSLAM 16 and is a network element of the access network 12. Because the external DSLAM hosted storage unit 35 is not mounted within the DSLAM 16, many attributes associated with the external DSLAM-hosted storage unit 35, such as power consumption, heat dissipation and size, do not directly impact the design of the DSLAM 16. Furthermore, the external DSLAM-hosted storage unit 35 may be an off-the-shelf storage device because it is not mounted within the DSLAM 16.

It is contemplated and disclosed herein that in at least one embodiment (not shown) of the communication system 10, the internal DSLAM-hosted storage card 26 or the external DSLAM-hosted storage unit 35 is omitted. In the case where the external DSLAM-hosted storage unit 35 is omitted, the SA card 28 may also be omitted.

Figure 2:
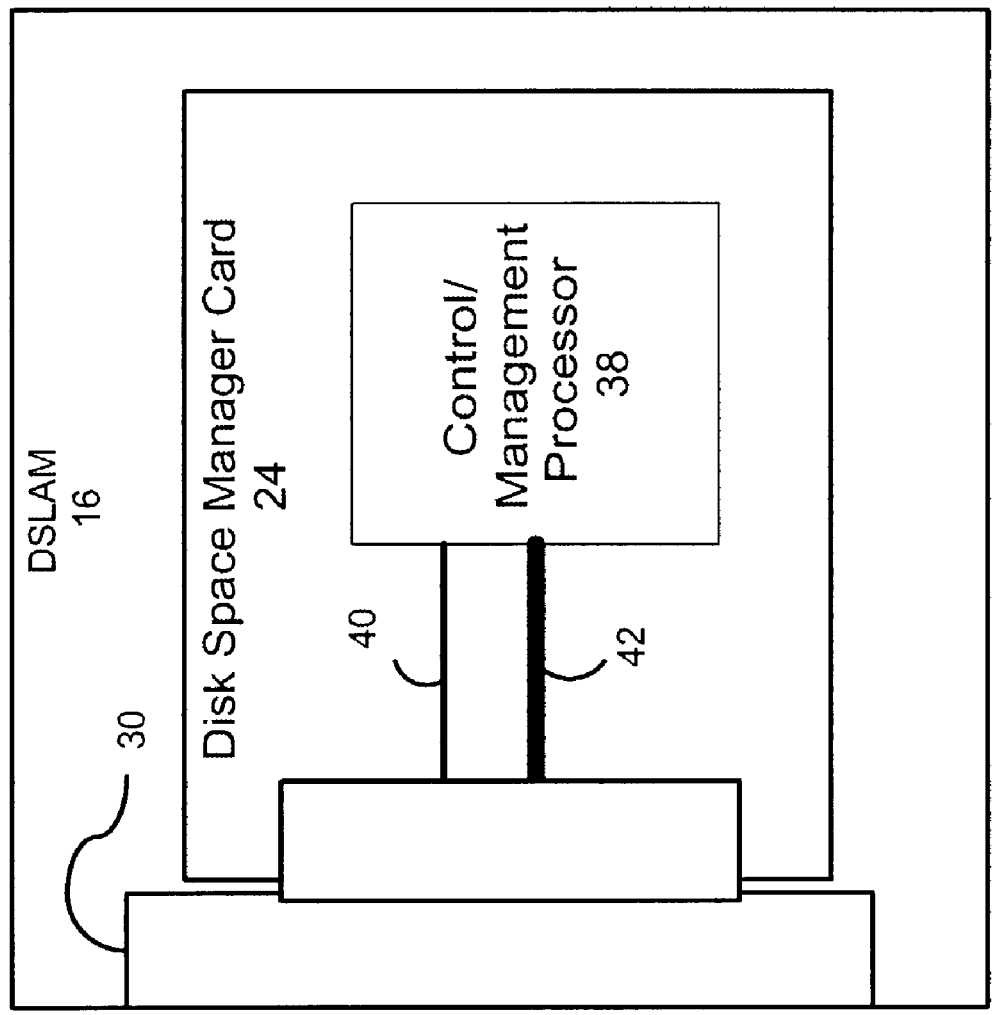
FIG. 2 is a block diagram depicting an embodiment of a Disk Space Management card in accordance with the disclosures made herein.

An embodiment of the DSM card 24 is depicted in FIG. 2. As depicted, the DSM card 24 includes a control/management processor 38 (i.e., the DSM control/management processor 38). The DSM control/management processor 38 is connected via a first bus 40 to the internal DSLAM-hosted storage card 26 and/or the SA card 28 (e.g., cross connected through the backplane 30). The DSM card 24 may be connected via a second bus 42 to the DSLAM management system 18. The DSM control/management processor 38 is adapted for facilitating functions for affecting operation of the internal DSLAM-hosted storage card 26 and/or the SA card 28 and for enabling control/configuration of the DSM card 24 via the DSLAM management system (or other system suitable configured for controlling/configuring the DSM card 24).

Figure 3:
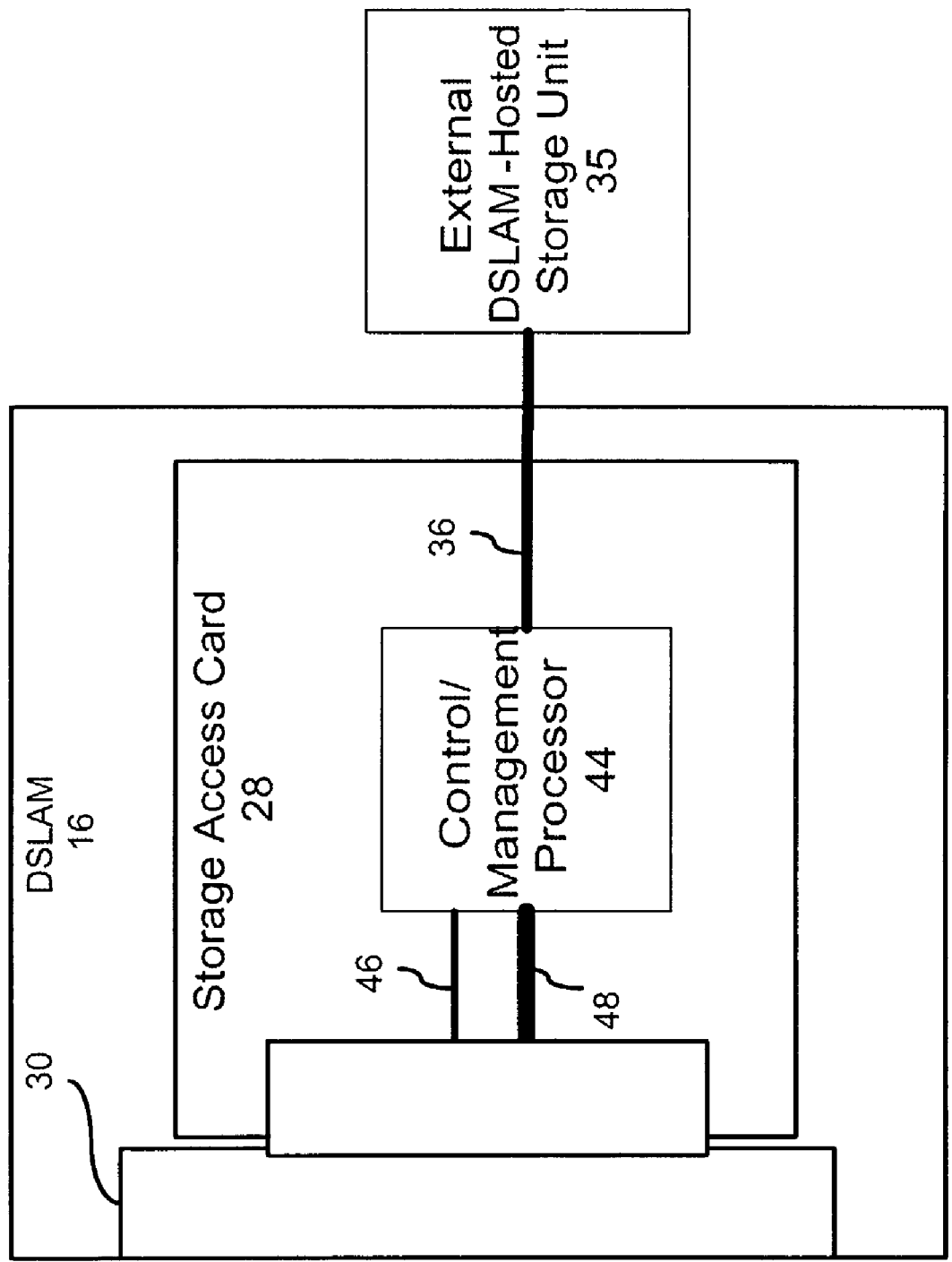
FIG. 3 is a block diagram view depicting an embodiment of a storage access card in accordance with the disclosures made herein.

An embodiment of the SA card 28 is depicted in FIG. 3. As depicted, the SA card 28 includes a control/management processor 44 (i.e., the SA control/management processor 44). The SA control/management processor 44 is connected to the DSM card 24 and/or to the DSLAM-hosted application card 29 via a control bus 46 and a data bus 48 (e.g., by a control cross-connection and a data cross-connection through the backplane 30). The high-speed interface 36 is connected between the SA control/management processor 44 and the external DSLAM-hosted storage unit 35. The SA card 28 is adapted for communication with the DSLAM-hosted application card 29 for determining how much storage space the DSLAM-hosted application card 29 requires.

Because the external DSLAM-hosted storage unit 35 is non-specific in its application, the SA control/management processor 44 will allow several DSLAM-hosted application cards to share the available storage space of the external DSLAM-hosted storage device 34. Application cards hosted by the DSLAM 16 (e.g., the DSLAM-hosted application card 29)and/or application cards subtended from the DSLAM (not shown) will communicate with the SA card 28 through the backplane 30 and be channeled through the SA card 28 to the high-speed interface 36 between the SA card 28 and the external DSLAM-hosted storage unit 35. With the ability of other cards in the DSLAM 16 to communicate and set-up data paths to the SA card 28, the external DSLAM-hosted storage unit 35 can be used for content storage, hosting a database to keep track of users, or merely serve as a "hard-drive" for DSLAM-hosted application cards (e.g., the DSLAM-hosted application card 29).

Figure 4:
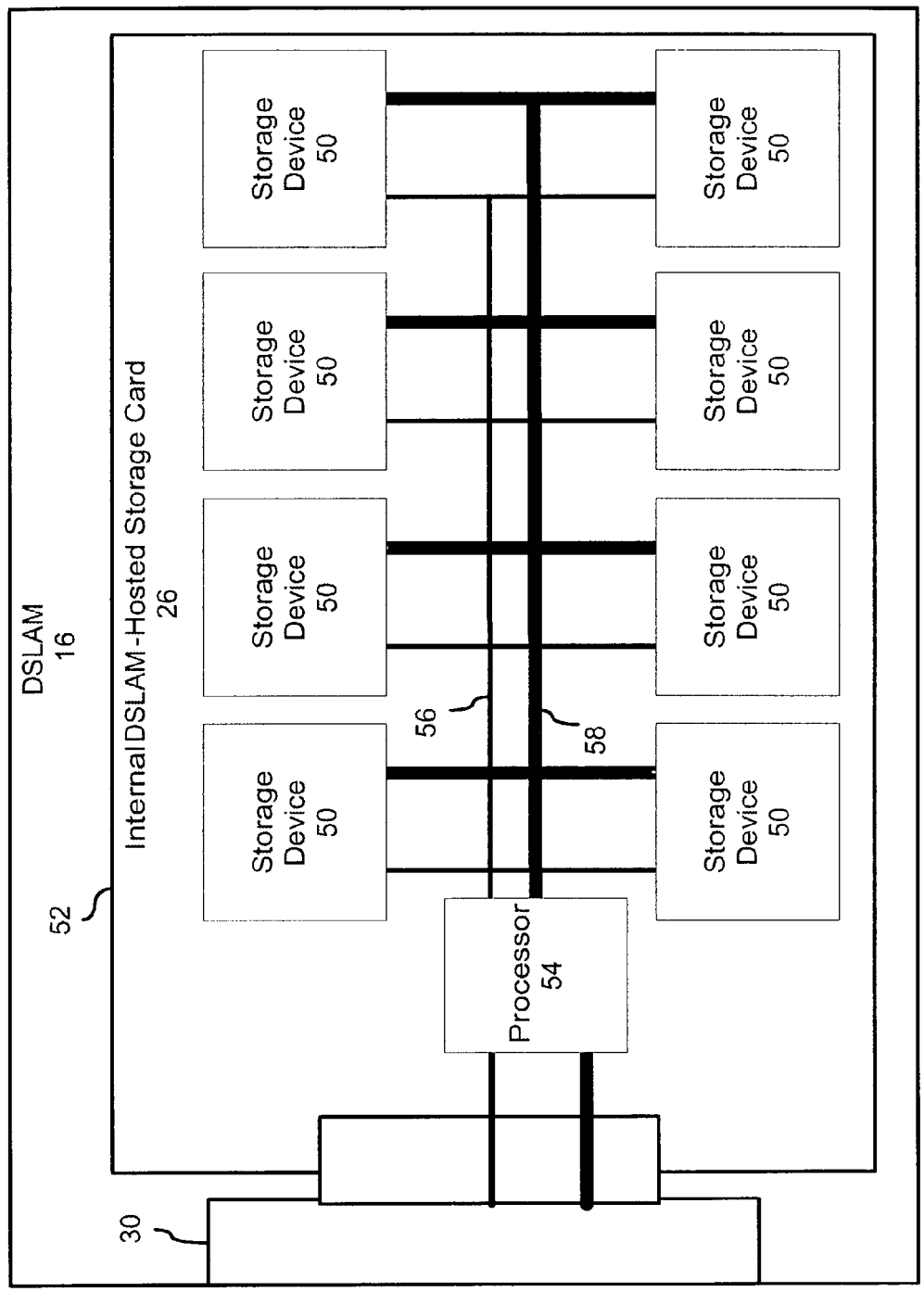
FIG. 4 is a block diagram view depicting an embodiment of an internal DSLAM-hosted storage card in accordance with the disclosures made herein.

An embodiment of the internal DSLAM-hosted storage card 26 is depicted in FIG. 4. As depicted, the internal DSLAM-hosted storage card 26 includes a series of discrete storage devices 50 mounted on a printed circuit board 52 adapted for being mounted in one or more slots of the chassis of the DSLAM 16. Attributes such as size, power consumption, etc will affect how many slots the card will be mounted in. Hard drive units designed for use in personal computers and/or laptop computers are examples of the discrete storage devices 50. A control processor 54 is mounted on the card 52 and is adapted for managing access to and from the discrete storage devices 50. A control bus 56 is connected between each one of the discrete storage devices and the control processor 54. A data bus 58 is connected between each one of the discrete storage devices and the control processor 54.

Internal DSLAM-hosted storage cards in accordance with embodiments of the disclosures made herein may be designed in several different sizes and configurations depending on the technology of storage devices chosen and the application it is designed to support. Furthermore, such internal DSLAM-hosted storage cards are adapted for being used by DSLAM-hosted application cards residing on or subtended from an associated DSLAM. Because such storage cards may be designed for a non-specific application, it is contemplated herein that a processor may be provided on an internal DSLAM-hosted storage card for allowing several DSLAM-hosted application cards to share available storage space of the storage card.

Figure 5A:
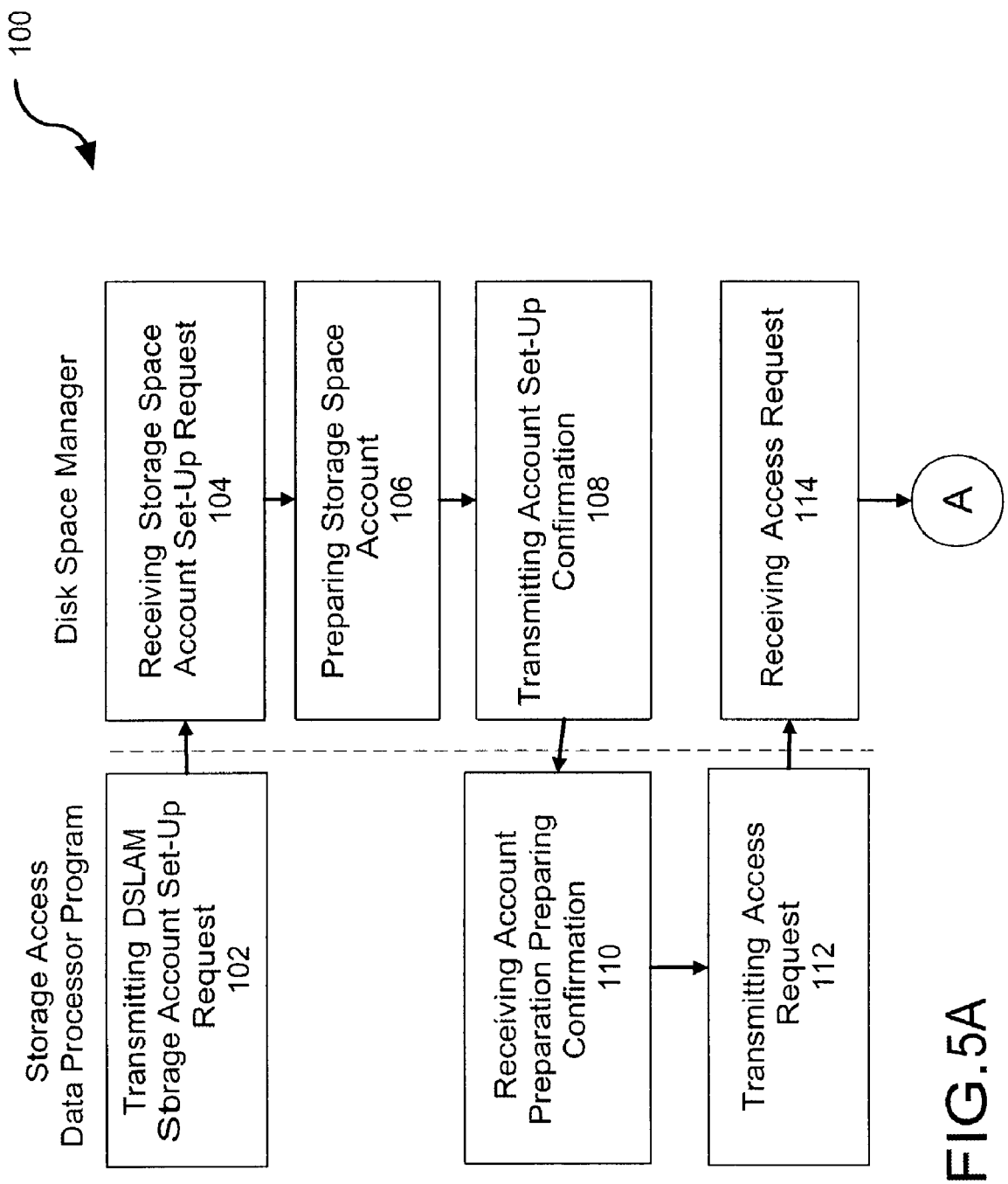
FIGS. 5A and 5B are flow chart views depicting an embodiment of a method for facilitating DSLAM-hosted information storage functionality in accordance with the disclosures made herein.
Figure 5B:
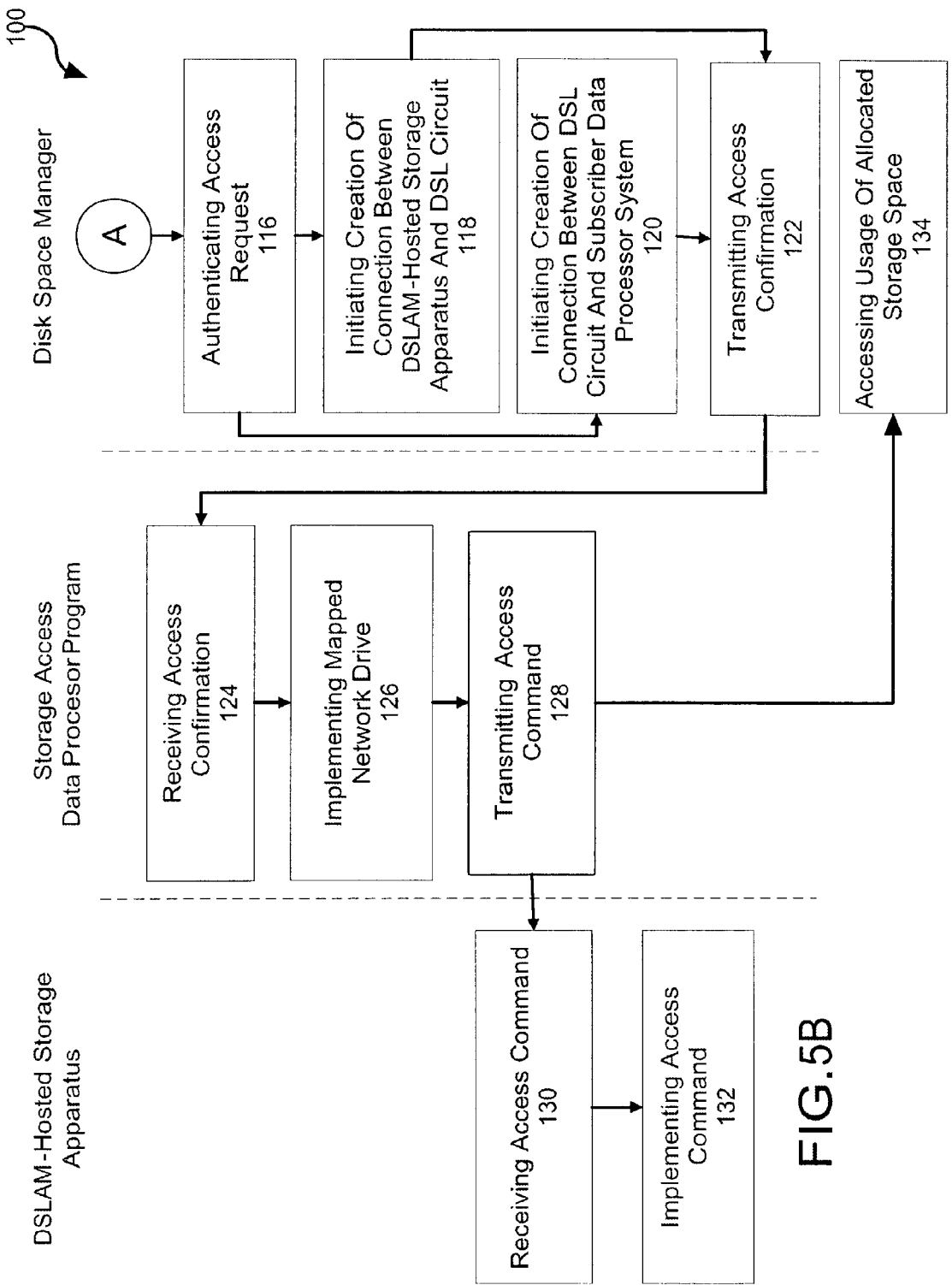

FIGS. 5A and 5B depict an embodiment of a method for facilitating DSLAM-hosted information storage functionality in accordance with the disclosures made herein. At an operation 102 in the method 100, a DSLAM storage account set-up request is transmitted from a Storage Access Data Processor Program (SADPP) of a Subscriber Data Processing System (SDPS) to a Disk Space Manager (DSM) of a Digital Subscriber Line Access Multiplexer (DSLAM) serving the subscriber data processing system. The DSLAM storage account set-up request is a request for enabling a mapped network drive to be provided on the DSPS. In response to the DSM performing an operation 104 for receiving the storage space account set-up request, the DSM performs an operation 106 for preparing a DSLAM storage account. After preparing the DSLAM storage account, the DSM performs an operation 108 for transmitting an account set-up confirmation for reception by the SADPP.

The DSLAM storage account specifies account information such as subscriber name, subscriber address, an allocated amount of storage space, subscriber authentication information (passcode, username, etc), a DSLAM-hosted storage apparatus identifier, a mapped network drive designation, etc. Certain account information (e.g., subscriber authentication information) may be generated by the DSM. In this manner, a mapped network drive may be implemented at the SDPS for enabling subscriber information to be stored on and retrieved from a DSLAM-hosted storage apparatus.

After the SADPP performs an operation 110 for receiving the account set-up confirmation, the SADPP performs an operation 112 for transmitting an access request for reception by the DSM. For example, at some point in time after the storage account is created, the subscriber implements a desire to use the mapped network drive. In response to the DSM performing an operation 114 for receiving the access request, the DSM performs an operation 116 for authenticating the access request. One embodiment of authentication of the access request includes verifying that a passcode designated in the access request is valid with respect to a user name.

In response to the access request being successfully authenticated, the DSM performs an operation 118 for initiating creation of a connection between a DSLAM-hosted storage apparatus serving the SDPS and a Digital Subscriber Line (DSL) circuit (e.g., a DSL line card) serving the SDPS and an operation 120 for initiating creation of a connection between the SPDS and the DSL circuit serving the SDPS. Accordingly, the SDPS has a network drive connection supporting the mapped network drive. In at least one embodiment of the disclosures made herein, the SADPP must remain running to maintain the network drive connection.

After such connections are initiated (e.g., after such connections are successfully created), the DSM performs an operation 122 for transmitting an access confirmation for reception by the SADPP. In response to the SADPP performing an operation 124 for receiving the access confirmation, the SADPP performs an operation 126 for implementing the mapped network drive. One example of implementing the mapped network drive includes displaying a drive representation on a visual display of the SDPS. After implementing the mapped network drive (e.g., at an instance where specified information needs to be stored on or retrieved from the DSLAM-hosted storage apparatus), the SADPP performs an operation 128 for transmitting an access command for reception by the DSLAM-hosted storage apparatus.

In response to the DSLAM-hosted storage apparatus performing an operation 130 for receiving the access command, the DSLAM-hosted storage apparatus performs an operation 132 for implementing the access command. Examples of the access command include retrieving a designated file, storing a designated information file, listing stored files, etc. In response to the SADPP performing the operation 128 for transmitting an access command, the DSM performs an operation 134 for accessing usage of the subscriber's allocated storage space on the DSLAM-hosted storage apparatus. One example of assessing usage of the subscriber's allocated storage space includes determining a percentage of the allocated storage space that is utilized (i.e., filled).

In at least one embodiment of a communication system in accordance with the disclosures made herein, the communication system includes one or more one data processors and one or more data processing program for carrying out at least a portion of the functionality provided by such a communication system. Specifically, the one or more data processor program control at least a portion of the operations associated with facilitating the functionality provided by the communication system. For example, a first data processor and data processor program (e.g., of the Disk Space Manager) are adapted for carrying out the functionality (e.g., appropriate portions of the method disclosed herein) associated with the Disk Space Manager. Similarly, a second data processor program and data processor (e.g., of the Subscriber Data Processing System) adapted for carrying out functionality (e.g., appropriate portions of the method disclosed herein) associated with the Subscriber Data Processing System.

The one or more data processor programs may be resident on one or more data processing modules (e.g. a card including the one or more data processors) or may be accessible by a respective data processor from an apparatus such as a diskette, a compact disk, a network storage device, a component of the communication system or other suitable apparatus. The term data processor program is defined herein to refer to computer software, data processor algorithms or any other type of instruction code capable of controlling operations associated with a data processor. A data processor program accessible from an apparatus by a data processor is defined herein as a data processor program product.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A Digital Subscriber Line Access Multiplexer (DSLAM), comprising:
    a storage apparatus; and
    a storage management apparatus for enabling data storage functionality to be facilitated between a subscriber data processing system and the storage apparatus, wherein said data storage functionality includes designating at least a portion of available storage space of the storage apparatus as a mapped network drive on the subscriber data processing system.

2. The DSLAM of claim 1 wherein the storage apparatus is a card mounted within a slot of a DSLAM chassis.

3. The DSLAM of claim 1 wherein the storage apparatus includes a printed circuit substrate and a plurality of storage devices mounted on the printed circuit substrate.

4. The DSLAM of claim 3 wherein;
    the storage apparatus further includes a control processor mounted on the printed circuit substrate;
    a control bus and a data bus are provided between the control processor and each one of said storage devices.

5. The DSLAM of claim 1 wherein the storage management apparatus is a card mounted within a slot of a DSLAM chassis.

6. The DSLAM of claim 1 wherein:
    said data storage functionality further includes preparing a subscriber storage space account; and
    the storage space account designates an allocated amount of said available storage space corresponding to available storage space of the mapped network drive.

7. The DSLAM of claim 1 wherein said data storage functionality further includes:
    receiving a storage space access request from a data processing system accessible by a subscriber; and
    creating a cross-connection between the storage apparatus and a Digital Subscriber Line (DSL) circuit serving the subscriber in response to verifying the storage space access request.

8. The DSLAM of claim 1 wherein said data storage functionality further includes creating at least one of a virtual connection (VC) and a tunnel between a Digital Subscriber Line (DSL) circuit serving a subscriber and a subscriber data processing system.

9. The DSLAM of claim 1 wherein said data storage functionality further includes creating a virtual connection (VC) between a Digital Subscriber Line (DSL) circuit serving a subscriber and a subscriber data processing system and for assigning a level of Quality of Service (QoS) to the VC.

10. The DSLAM of claim 1, further comprising:
a storage access apparatus adapted for being connected to an externally-mounted storage apparatus via a high-speed interface and for enabling subscriber files to be stored on and retrieved from the storage apparatus.

11. The DSLAM of claim 10 wherein the high-speed interface terminates on the storage access apparatus.

12. The DSLAM of claim 10, further comprising:
A DSLAM-hosted application apparatus connected to at least one of the storage apparatus and an externally-mounted storage device, wherein DSLAM-hosted application apparatus is adapted for being connected to the storage apparatus via at least one of a data cross-connect and a control cross-connect and for being connected to the externally-mounted storage device via a high-speed interface.

13. A Digital Subscriber Line Access Multiplexer (DSLAM), comprising:
a storage apparatus; and
a storage management apparatus for enabling data storage functionality to be facilitated between a subscriber data processing system and the storage apparatus, wherein said data storage functionality includes:
preparing a subscriber storage space account designating at least a portion of available storage space of the storage apparatus as a mapped network drive on the subscriber data processing system;
receiving a storage space access request from a data processing system accessible by a subscriber;
creating a cross-connection between the storage apparatus and a Digital Subscriber Line (DSL) circuit serving the subscriber in response to verifying the storage space access request; and
creating at least one of a virtual connection (VC) and a tunnel between a Digital Subscriber Line (DSL) circuit serving a subscriber and a subscriber data processing system.

14. The DSLAM of claim 13, further comprising:
a storage access apparatus adapted for being connected to an externally-mounted storage apparatus via a high-speed interface and for enabling subscriber files to be stored on and retrieved from the storage apparatus.

15. The DSLAM of claim 14 wherein the high-speed interface terminates on the storage access apparatus.

16. The DSLAM of claim 14, further comprising:
a DSLAM-hosted application apparatus connected to at least one of the storage apparatus and an externally-mounted storage device, wherein the DSLAM-hosted application apparatus is adapted for being connected to the storage apparatus via at least one of a data cross-connect and a control cross-connect and for being connected to the externally-mounted storage device via a high-speed interface.

17. A Digital Subscriber Line Access Multiplexer (DSLAM), comprising:
multiplexing means for facilitating Digital Subscriber Line Access Multiplexing (DSLAM) functionality;
storage means for having subscriber files stored thereon and retrieved therefrom; and
storage management means for communicating with a subscriber data processing system for enabling said subscriber files to be stored on and retrieved from said storage means and for designating at least a portion of available storage space of said storage means as a mapped network drive on the subscriber data processing system, wherein said subscriber files are transmitted over a connection between said multiplexing means and the subscriber data processing system.

18. A subscriber data processing system, comprising:
a modem for enabling a connection to be implemented on a Digital Subscriber Line (DSL) between the modem and a Digital Subscriber Line Access Multiplexer (DSLAM);
a storage access data processor program for enabling a mapped network drive to be accessed, wherein the mapped network drive is a virtual representation of allocated storage space on a storage apparatus connected to the DSLAM and wherein subscriber files are stored on and retrieved from the storage apparatus via the connection.

19. The system of claim 18 wherein said data storage functionality includes designating at least a portion of available storage space of the storage apparatus as a mapped network drive on the subscriber data processing system.

20. The system of claim 18 wherein the storage access data processor program is further adapted for enabling subscriber authentication information to be transmitted for reception by a storage management apparatus of the DSLAM.

21. The system of claim 20 wherein the storage access data processor program is further adapted for facilitating designation of a drive identifier corresponding to the mapped network drive in response to said subscriber authentication information being successfully verified by the storage management apparatus.

22. The system of claim 18 wherein:
the storage access data processor program is further adapted for confirming a type of connection capable of being created between the modem and the DSLAM.

23. The system of claim 18 wherein: the type of connection is selected from a group of types of connections including a virtual connection and a tunnel connection.

24. An apparatus adapted for hosting file storage functionality and for providing Digital Subscriber Line Access Multiplexer (DSLAM) functionality, comprising:
a Digital Subscriber Line (DSL) card;
a storage apparatus for having subscriber files stored thereon and retrieved therefrom;
a storage management apparatus for enabling data storage functionality to be facilitated between a subscriber data processing system and the storage apparatus; and
a data processor program for enabling a data processor of the storage management apparatus to facilitate:
preparing a storage space account for a subscriber, wherein the storage space account designates at least a portion of available storage space of a DSLAM-hosted storage apparatus as a mapped network drive on a subscriber data processing system;
receiving a storage space access request from the subscriber data processing system; and
creating a cross-connection between the DSLAM-hosted storage apparatus and a Digital Subscriber Line (DSL) circuit serving the subscriber data processing system in response to verifying the storage space access request.

25. The apparatus of claim 24 wherein the data processor program is further adapted for enabling the data processor to facilitate:

creating at least one of a virtual connection (VC) and a tunnel between the DSL card and the subscriber data processing system in response to verifying the storage access request.

26. The apparatus of claim 24 wherein the data processor program is further adapted for enabling the data processor to facilitate:
   creating a virtual connection (VC) between the DSL card and the subscriber data processing system in response to verifying the storage access request; and
   assigning a level of Quality of Service (QoS) to the VC.

27. The apparatus of claim 26 wherein enabling the data processor to facilitate receiving the storage space access request includes enabling the data processor to facilitate receiving subscriber authentication information.

28. The apparatus of claim 27 wherein the data processor program is further adapted for enabling the data processor to facilitate:
   facilitating designation of a drive identifier corresponding to the mapped network drive in response to said subscriber authentication information being successfully verified by the storage management apparatus.

29. A method for providing file storage functionality via a network element for providing Digital Subscriber Line Access Multiplexer (DSLAM) functionality, comprising:
   preparing a storage space account for a subscriber, wherein the storage space account designates at least a portion of available storage space of a DSLAM-hosted storage apparatus as a mapped network drive on a subscriber data processing system;
   receiving a storage space access request from the subscriber data processing system of a subscriber; and
   creating a cross-connection between the DSLAM-hosted storage apparatus and a Digital Subscriber Line (DSL) circuit serving the subscriber data processing system in response to verifying the storage space access request.

30. The method of claim 29, further comprising:
   creating at least one of a virtual connection (VC) and a tunnel between a Digital Subscriber Line (DSL) circuit serving the subscriber and the subscriber data processing system in response to verifying the storage access request.

31. The method of claim 29, further comprising:
   creating a virtual connection (VC) between a Digital Subscriber Line (DSL) circuit serving the subscriber and the subscriber data processing system in response to verifying the storage access request; and
   assigning a level of Quality of Service (QoS) to the VC.

32. The method of claim 29 wherein receiving the storage space access request includes receiving subscriber authentication information.

33. The method of claim 32, further comprising:
   facilitating designation of a drive identifier corresponding to the mapped network drive in response to said subscriber authentication information being successfully verified by the storage management apparatus.

34. A data processor program product, comprising:
   a data processor program processable by a data processor;
   an apparatus from which the data processor program is accessible by the data processor; and
   the data processor program for enabling the data processor to facilitate:
      preparing a storage space account for a subscriber, wherein the storage space account designates at least a portion of available storage space of a DSLAM-hosted storage apparatus as a mapped network drive on a subscriber data processing system;
      receiving a storage space access request from the subscriber data processing system of a subscriber; and
      creating a cross-connection between the DSLAM-hosted storage apparatus and a Digital Subscriber Line (DSL) circuit serving the subscriber data processing system in response to verifying the storage space access request.

35. The method of claim 34, further comprising:
   creating at least one of a virtual connection (VC) and a tunnel between a Digital Subscriber Line (DSL) circuit serving the subscriber and the subscriber data processing system in response to verifying the storage access request.

36. The method of claim 34, further comprising:
   creating a virtual connection (VC) between a Digital Subscriber Line (DSL) circuit serving the subscriber and the subscriber data processing system in response to verifying the storage access request; and
   assigning a level of Quality of Service (QoS) to the VC.

37. The method of claim 34 wherein receiving the storage space access request includes receiving subscriber authentication information.

38. The method of claim 37, further comprising:
   facilitating designation of a drive identifier corresponding to the mapped network drive in response to said subscriber authentication information being successfully verified by the storage management apparatus.

* * * * *